(12) United States Patent
Iijima

(10) Patent No.: US 6,447,950 B1
(45) Date of Patent: Sep. 10, 2002

(54) ELECTRODE FOR BATTERY, METHOD OF MANUFACTURING THE SAME AND BATTERY

(75) Inventor: Tadayoshi Iijima, Saku (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/646,107

(22) PCT Filed: Mar. 24, 1999

(86) PCT No.: PCT/JP99/01514

§ 371 (c)(1),
(2), (4) Date: Sep. 25, 2000

(87) PCT Pub. No.: WO99/50918

PCT Pub. Date: Oct. 7, 1999

(30) Foreign Application Priority Data

Mar. 26, 1998 (JP) ............................................ 10-100001

(51) Int. Cl.⁷ ............................. H01M 4/02; H01M 2/28
(52) U.S. Cl. ........................ 429/209; 429/211; 429/233
(58) Field of Search ................................ 429/211, 208, 429/209, 137, 128, 232, 245, 239, 240, 131, 142, 143; 29/623.5, 623.1, 623.4

(56) References Cited

U.S. PATENT DOCUMENTS 5,476,734 A * 12/1995 Pulley et al. ................ 429/244

FOREIGN PATENT DOCUMENTS

| JP | 57158962 A | 9/1982 |
| JP | 03272565 A | 12/1991 |
| JP | 04249863 A | 9/1992 |
| JP | 09213338 A | 8/1997 |

* cited by examiner

Primary Examiner—Stephen Kalafut
Assistant Examiner—R Alejandro
(74) Attorney, Agent, or Firm—Rader, Fishman & Grauer PLLC

(57) ABSTRACT

An electrode for a battery in which a collector and an electrode tab are connected with a novel connection structure without impairing electrical connection, and a method of manufacturing the electrode quite simply are provided. Further, a battery having this electrode for the battery is provided. A collector (2) and a tab (3) are connected via a graphite layer (4). The graphite layer is formed on the surface of the collector to be connected with the tab and/or the surface of the tab to be connected with the collector, the portions to be connected of the collector and the tab are overlapped on each other with the graphite layer interposed between the collector and the tab, and a pressure is applied to the overlapped portions to connect the collector (2) with the tab (3). It is preferable that the collector (2) is made of a conductive thin film formed on a resin film (5).

8 Claims, 1 Drawing Sheet

ELECTRODE FOR BATTERY, METHOD OF MANUFACTURING THE SAME AND BATTERY

TECHNICAL FIELD

The present invention relates to an electrode for a battery in which an electrode tab is connected, a method of manufacturing the same, and a battery having the electrode. The present invention is characterized by a novel connection structure and a connection method of a collector and an electrode tab.

The tab referred to in the present invention is generally called a (positive electrode or negative electrode) reed, a connection reed, a (positive electrode or negative electrode) terminal or the like, and it is contacted or connected with the collector to provide electrical connection between the collector and the outside.

BACKGROUND ART

According to miniaturization and weight reduction of electronic appliances such as various OA appliances, VTR cameras, portable phones and the like in recent years, a high performance of a secondary battery used in these electronic appliances has been required. In order to meet such a requirement, the development of a lithium ion secondary battery that occludes or releases lithium as a non-aqueous electrolyte battery having a high discharge potential and a high discharge capacity has been rapidly conducted, and it has been put to practical use.

Each of electrodes, a positive electrode and a negative electrode of a non-aqueous electrolyte battery is constructed of an electrode active material layer, a collector and an electrode tab. The electrode active material layer is generally formed by mixing an active material with a binder to form an electrode coating-material (mixture), applying the same onto the collector and drying it. The tab is contacted or connected with the collector to provide electrical connection between the collector and the outside. It is ordinarily connected with the collector through welding. Further, another end of the tab is welded with an external can or cap of the battery.

For example, in a lithium ion secondary battery, an electrochemical reaction occurs in an active material layer. At this time, electricity is passed through a collector and a tab, and withdrawn to the outside or supplied from the outside. That is, at the time of charging, electricity supplied to an external can or cap is passed to the collector through the tab. From the collector, electricity is passed to the active material in the electrode active material layer, and the electrochemical reaction occurs to allow charging. At the time of discharging, the order in the charging is inverted. The chemical reaction occurs with the active material in the electrode active material layer, and electricity obtained here is passed from the collector to the tab and from the tab to the external can or cap to allow discharging.

In the lithium ion secondary battery, generally, an aluminum foil is used in a positive electrode and a copper foil in a negative electrode in the collector. Further, generally, aluminum is used in a positive electrode and nickel or the like in a negative electrode in the tab. And, an active material layer is not formed on a part of the surface of the collector, and the tab is connected with this portion through welding.

The tab and the collector are welded by a method such as spot welding, laser welding or the like. However, a large-sized welding device is required.

Moreover, as described in, for example, Japanese Laid-Open Patent Publication No. 9-213,338/1997, when a collector is formed as a thin film on a resin film or a resin sheet, it is almost impossible to weld a tab with this thin film collector.

When connection is conducted with an adhesive as a connection method other than welding, the electrical connection between the tab and the collector is extremely worsened (that is, an electrical resistance is extremely increased). Further, when the connection is conducted with a conductive paste, it is put between the tab and the collector. Accordingly, there are disadvantages that a solvent is hardly removed to make the drying difficult, a curing temperature is high, and so forth.

DISCLOSURE OF THE INVENTION

OBJECTS OF THE INVENTION

Thus, the object of the present invention is to provide, upon solving the problems of the prior art, an electrode for a battery in which a collector and an electrode tab are connected by a novel connection structure without impairing electrical connection, and a method of manufacturing the electrode quite simply. Further, another object of the present invention is to provide a battery having this electrode for the battery.

SUMMARY OF THE INVENTION

The present inventors have assiduously conducted investigations. Consequently, the inventor has focussed on the fact that graphites tend to adhere to each other when a pressure is applied thereto, and have found that a collector and a tab can be connected by applying a pressure with graphite interposed therebetween. This finding has led to the completion of the invention.

That is, the present invention is an electrode for a battery comprising an electrode active material layer, a collector and an electrode tab, the collector and the tab being connected via a graphite layer.

Further, the present invention is a method of manufacturing an electrode for a battery comprising an electrode active material layer, a collector and an electrode tab by connecting the collector with the electrode tab, which method comprises forming a graphite layer on the surface of the collector to be connected with the tab and/or the surface of the tab to be connected with the collector, overlapping the portions to be connected of the collector and the tab on each other with the graphite layer interposed between the connector and the tab, and applying a pressure to the overlapped portions of the collector and the tab to connect the collector with the tab.

The electrode and the method of manufacturing the same in the present invention can be applied to both electrodes, a positive electrode and a negative electrode.

Further, the present invention is a battery having the electrode for the battery of the present invention or the electrode for the battery obtained by the method of the present invention as a positive electrode and/or a negative electrode.

Still further, the present invention is a non-aqueous electrolyte battery having the electrode for the battery of the present invention or the electrode for the battery obtained by the method of the present invention as a positive electrode and/or a negative electrode.

DETAILED DESCRIPTION OF THE INVENTION

Figure 1:
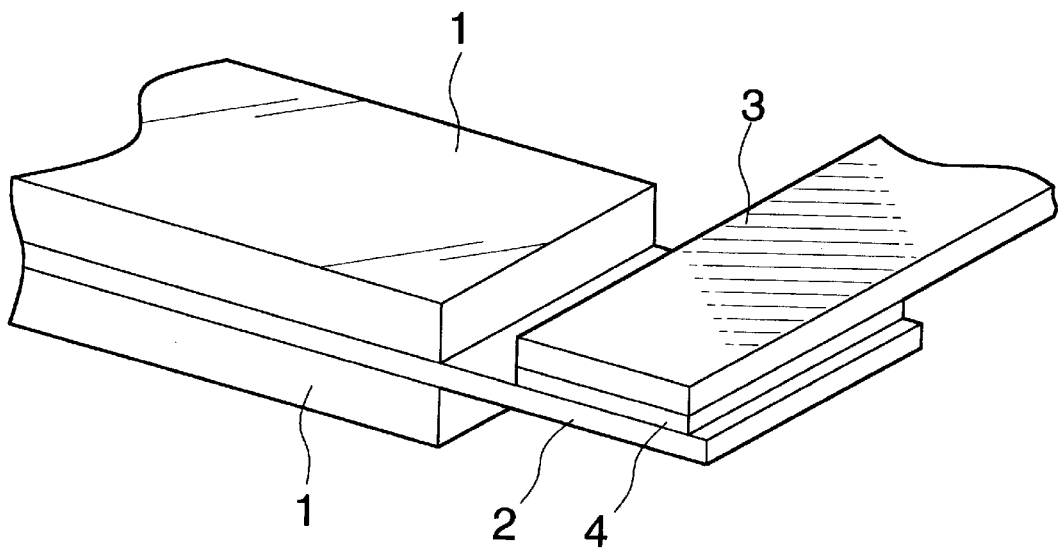
FIG. 1 is a partial perspective view showing an example of a connection structure of a collector and a tab of an electrode according to the invention.

First, an electrode active material layer is described. The electrode active material layer is generally formed by mixing an electrode active material with a binder to form an electrode coating-material (mixture), applying the same on the collector and drying it. Further, a conductive agent or additives are sometimes added as required.

In the present invention, the electrode active material is not particularly limited, and various electrode active materials known so far can be used.

Examples of the positive electrode active material in, for example, a lithium ion secondary battery, include inorganic compounds such as oxides or chalcogen compounds of transition metals containing an alkali metal, conductive polymers such as polyacetylene, poly-p-phenylene, polyphenylenevinylene, polyaniline, polypyrrole, polyazulene, polyphthalocyanine, polythiophene and the like, crosslinked polymers having a disulfide linkage, thionyl chloride and the like. Of these, oxides or chalcogen compounds of transition metals such as cobalt, manganese, molybdenum, vanadium, chromium, iron, copper, titanium and the like are preferable. $Li_xCoO_2$ ($0<x\leq1.0$), $Li_xNiO_2$ ($0<x\leq1.0$), $Li_xCo_yNi_{1-y}O_2$ ($0<x\leq1.0$, $0<y\leq1.0$), $Li_{1+x}Mn_{2-x}O_4$ ($0\leq x\leq\frac{1}{3}$), $Li(M, Mn)_2O_4$ (M=Cr, Co, Al, B) and the like are especially preferable in view of a high potential, a stability and a long life.

Further, as a negative electrode material, for example, a carbonaceous material, tin oxide and the like are used. The carbonaceous material is not particularly limited. Examples thereof include amorphous carbon, coal coke, petroleum coke, vapor growth carbon fibers, hard carbon (slightly graphitizable carbon), polymer carbon, natural graphite, artificial graphite and the like. The material can be selected from these by those skilled in the art as required according to characteristics of a desired battery. When the material is used in a negative electrode of a secondary battery using a non-aqueous electrolyte solution containing an alkali metal salt, PAN-type carbon fibers, pitch-type carbon fibers and vapor growth carbon fibers are preferable. PAN-type carbon fibers and pitch-type carbon fibers are especially preferable because doping of a lithium ion is good.

A binder for electrode coating-material is not particularly limited. Various binders which have been so far used, such as a crystalline resin, a non-crystalline resin and the like can be used. For example, polyacrylonitrile (PAN), polyethylene terephthalate, polyvinylidene fluoride (PVDF), polyvinyl fluoride, fluororubber and the like are available.

The binder is used in an amount of, usually 1 to 40 parts by weight, preferably 1 to 25 parts by weight, especially preferably 1 to 15 parts by weight per 100 parts by weight of the electrode active material.

The solvent is not particularly limited. Various solvents which have been so far used in preparing an electrode coating-material are available. Examples thereof include N-methylpyrrolidone (NMP), methyl isobutyl ketone (MIBK), methyl ethyl ketone (MEK), cyclohexanone, toluene, water and the like.

The conductive agent can be added, as required, for the purpose of supplementing an electron conductivity of the electrode active material. The conductive agent is not particularly limited, and various known conductive agents can be used. Examples thereof include graphite, acetylene black, metallic fine particles and the like.

Further, various known additives such as lithium carbonate, oxalic acid, maleic acid and the like can also be added.

Such a slurry electrode coating-material is applied onto the electrode collector, and dried.

In the present invention, the material of the electrode collector is not particularly limited so long as it is an electron conductor that does not cause a chemical change in the battery constructed. For example, aluminum, copper, stainless steel, nickel, titanium, baked carbon and the like can be used. Further, the surface of the collector made of these may be treated with carbon, nickel, titanium, silver or the like. In the lithium ion secondary battery, it is advisable that an aluminum foil is used in a positive electrode and a copper foil in a negative electrode in consideration of an oxidation resistance, a flexibility of the electrode and costs. The thickness of the electrode collector is usually 1 to 30 $\mu$m, preferably 5 to 20 $\mu$m. However, it is not particularly limited.

The present invention can be applied to an electrode in which the collector is also used as a support as stated above. However, when the present invention is applied to an electrode in which the collector is made of a conductive thin film formed on a surface of a resin film or a resin sheet, the effects of the present invention are more increased. That is, this is because in case of an electrode in which a resin film or a resin sheet is used as a support, a collector made of a conductive thin film is formed on the surface of the support and an electrode active material layer is formed on the collector, it is almost impossible that the tab is welded on such a conductive thin film collector.

Moreover, it is also possible that a resin film or sheet, a separator or the like is used as a substrate, an electrode active material layer is previously formed thereon and a collector is formed on the electrode active material layer through deposition, plating or the like. Alternatively, a collector may be formed on a resin film or sheet containing an electrode active material through deposition, plating or the like.

As a material of this resin film or resin sheet, polyethylene terephthalate, polyimide, polypropylene or the like can be used.

The conductive thin film can be formed through deposition, sputtering, plating or the like. As a material, for example, aluminum, copper or the like may be selected from those mentioned above as required. When the thin film is formed through deposition, it is possible to form a thinner film and to reduce the weight of the electrode. Thus, it is preferable. Further, the conductive thin film can strongly be joined with the resin film.

In the present invention, the tab is not particularly limited. Various known tabs having a thickness of about 10 to 1,000 $\mu$m can be used. Examples of the material of the tab include aluminum, nickel, copper, titanium, iron, gold, silver, platinum, stainless steel and the like. In the lithium ion secondary battery, it is preferable that aluminum is used in a positive electrode and nickel in a negative electrode.

Next, the novel connection structure and the connection method of the collector and the electrode tab in the present invention are described.

In the electrode for the battery of the present invention, the collector and the tab are connected via the graphite layer. Such a connection structure is obtained by forming the graphite layer on the surface of the collector to be connected with the tab and/or the surface of the tab to be connected with the collector, overlapping the portions to be connected of the collector and the tab on each other with the graphite layer interposed between the collector and the tab, and applying a pressure to the overlapped portions of the collector and the tab to connect the collector with the tab. In the collector, there is a portion in which the electrode active material layer is not formed and the metallic foil is exposed for connection with the tab. The tab is connected with this portion via the graphite layer.

As a method of forming the graphite layer on the portions to be connected of the collector and the tab, there is a vapor growth method. However, in view of costs, it is advisable to use a graphite-containing paste. This graphite-containing paste can be formed by mixing graphite, a binder and a solvent.

Examples of graphite used include natural graphite, artificial graphite, graphite formed by removing Si from SiC, graphite formed through vapor growth, expanded graphite, graphite intercalation compound and the like. It is advisable that these have a desired particle size through pulverization, classification or the like.

The particle diameter of graphite is determined depending on the thickness of the graphite layer, the mixing amount of the binder and the like. The particle diameter of graphite is preferably 0.1 to 1,000 $\mu$m, more preferably 1 to 100 $\mu$m.

Specific examples of graphite include LF series, Special Graphite manufactured by Chuetsu Graphite Works Co., Ltd., UFG series manufactured by Showa Denko Co., Ltd., KS series manufactured by LONZA Co., Ltd., MICROCARBO-G series manufactured by Kansai Netsukagaku Co., Ltd., Ecoscarbon series manufactured by Ecos Giken Co., Ltd., and the like.

The binder for graphite-containing paste is not particularly limited. A thermoplastic resin, a thermosetting resin, a polymer having a rubber elasticity and the like can be used. Examples of the binder include a fluoro-type polymer, polyvinyl alcohol, carboxymethyl cellulose, hydroxypropyl cellulose, regenerated cellulose, diacetyl cellulose, polyvinyl chloride, polyvinyl pyrrolidone, polyethylene, polypropylene, EPDM, sulfonated EPDM, SBR, polybutadiene, polyethylene oxide, a urethane resin, vinyl chloride and the like. These can be used either alone or in admixture of two or more. Basically, in compressed graphite, almost no electrolyte is immersed, and a resin which is dissolved in the electrolyte can also be used. However, a resin which is hardly attacked by the electrolyte is preferable.

In the lithium ion secondary battery, a fluoro-type polymer is generally used as the binder for the electrode active material layer, and it is advisable that a fluorine-containing polymer is used as the binder for the graphite-containing paste in the connecting portion too. In the fluorine-containing polymer, an atomic ratio of fluorine atom/carbon atom is preferably at least 0.75 and at most 1.5, more preferably at least 0.75 and at most 1.3. Examples of such a fluorine-containingpolymer include polytetrafluoroethylene, polyvinylidene fluoride, a vinylidene fluoride/ethylene trifluoride copolymer, an ethylene-tetrafluoroethylene copolymer, a propylene-tetrafluoroethylene copolymer and the like. Further, a fluorine-containing in which hydrogen in a main chain is replaced with an alkyl group can also be used.

Further, the amount of the binder in the graphite layer is preferably 1 to 60% by weight, more preferably 5 to 40% by weight in the graphite dry coated layer.

The solvent for the graphite-containing paste is not particularly limited, and general organic solvents can be used. Specific examples thereof include organic solvents, for example, saturated hydrocarbons such as hexane and the like, aromatic hydrocarbons such as toluene, xylene and the like, alcohols such as methanol, ethanol, propanol, butanol and the like, ketones such as acetone, methyl ethyl ketone, methyl isobutyl ketone, diisobutyl ketone and the like, esters such as ethyl acetate, butyl acetate and the like, ethers such as tetrahydrofuran, dioxane, diethyl ether and the like, amides such as N,N-dimethylformamide, N-methylpyrrolidone, N,N-dimethylacetamide and the like, halogenated hydrocarbons such as ethylene chloride, chlorobenzene and the like, and so forth. Of these, amide-type solvents are preferable because they can dissolve the fluorine-containing polymer. Further, these solvents can be used either alone or in admixture of two or more.

Moreover, an acid such as oxalic acid or the like may be added to the graphite-containing paste. When the paste of the electrode active material using the acid is applied on the collector and dried to form a coated layer, the acid evaporated is adhered to the connected portions of the collector and the tab to worsen the adhesion of the graphite layer to the collector. In order to make good the adhesion of the graphite layer, it is advisable that the acid is not adhered to the collector or the acid adhered is removed with water or the like.

Such a graphite-containing paste is applied onto the exposed portion of the metallic foil of the collector to be connected with the tab, and dried. Further, it is likewise applied onto the portion of the tab to be connected with the collector, and dried.

The coating of the graphite-containing paste can be conducted by a coating method which is generally well-known, such as a screen method, a reverse roll method, a direct roll method, a blade method, a knife method, an extrusion method, a curtain method, a gravure roll method, a bar coating method, a dip method, a kiss coating method or a squeezing method. Of these, a screen method is preferable.

Further, the coating amount of the graphite-containing paste is about 0.1 to 10 mg/cm$^2$, preferably about 0.5 to 2 mg/cm$^2$ per unit area in terms of an amount of graphite.

The drying after coating the graphite-containing paste can be conducted, for example, at 20 to 150° C. for about 30 seconds to 1 hour.

The collector and the tab having the graphite layers thus formed thereon respectively are overlapped such that both the graphite layers are contacted with each other, and a pressure is applied to the overlapped portions to connect the collector with the tab.

The higher the pressure at this time, the better the adhesion. However, as the pressure is increased, the adhesion difference is gradually lost. When the pressure is further increased, the tab is extended owing to a ductility of a metal, and a stress occurs on the contacted surface. Consequently, the tab is peeled off from the collector. Accordingly, in consideration of this, a pressure to be applied can be determined by those skilled in the art as required. Generally, it is advisable to apply a pressure of about 500 to 10,000 kg/cm$^2$.

It is advisable that a press is used to apply a pressure to the connecting portions of the collector and the tab. There are a roller press which is a combination of two or more rollers, a press in which a pressure is vertically applied using dies. In case of the roller press, a portion to be connected can be set in a wide range. It is also possible that the collector and the tab are sent to the roller press in this order and connected to each other and the electrode is then passed by decreasing the pressure or they are taken out by reverse rotation. When the corners of the dies are sharp in the press using the dies, the collector and the tab might be damaged. Thus, it is advisable to make round the corners.

The tab and the collector are strongly connected by such a simple operation. Graphite has a low electrical resistance and the electrical connection between the collector and the tab is also good.

In the present invention, in view of the connection strength, it is advisable that the pressure connection is conducted by forming the graphite layers on both the portions to be connected of the collector and the tab. It is, however, also possible that the pressure connection is conducted by forming the graphite layer on only one of the collector and the tab. Alternatively, it is also possible that the pressure connection is conducted by forming the graphite layer on the portion to be connected of one of the collector and the tab and, for example, an acetylene black layer on another portion to be connected.

According to the method of manufacturing the electrode for the battery in the present invention, the graphite layer is formed on the surface of the collector to be connected with the tab and/or the surface of the tab to be connected with the collector, the portions to be connected of the collector and the tab are overlapped on each other with the graphite layer interposed between the collector and the tab, and the collector and the tab are connected by applying a pressure to the overlapped portions of the collector and the tab. Consequently, the electrode for the battery in which the collector and the tab are strongly connected is obtained quite simply without impairing the electrical connection.

The method of manufacturing the electrode for the battery in the present invention is especially effective for the connection of the collector formed as the conductive thin film on the resin support with the tab which connection has been so far almost impossible through welding. Since such a collector can increase an energy density per unit weight, a lightweight battery having a high discharge capacity is obtained.

The electrode for the battery of the present invention can be used as an electrode in various batteries such as a primary battery, a secondary battery, a fuel cell and the like. It can preferably be used in a positive electrode or a negative electrode of a polymer battery and a secondary battery among these batteries. As a preferable secondary battery, a non-aqueous electrolyte secondary battery, especially a lithium ion secondary battery is mentioned.

The electrode for the battery of the present invention can be inserted into the battery in the same manner as the ordinary electrode in which the collector and the tab are connected though welding, and the battery can be manufactured. The electrolyte of the battery may be an electrolyte dissolved in a solvent or a solid electrolyte.

For example, in case of a lithium ion secondary battery, it is advisable that a positive electrode, a separator and a negative electrode are overlapped, wound up and placed in a battery can, the end of the negative electrode tab is welded on the bottom of the battery can and the end of the positive electrode tab on the seal cap respectively, and the electrolytic solution is then poured.

As the electrolyte of the battery in the present invention, electrolytic solution known so far can be used. Examples of the electrolytic solution in the non-aqueous electrolyte secondary battery include propylene carbonate, ethylene carbonate, γ-butyrolactone, N-methylpyrrolidone, acetonitrile, N,N-dimethylformamide, dimethyl sulfoxide, tetrahydrofuran, 1,3-dioxolan, methyl formate, sulfolane, oxazolidone, thionyl chloride, 1,2-dimethoxyethane, diethylene carbonate, derivatives or mixtures thereof and the like. Examples of the electrolyte contained in the electrolytic solution include a halide, a perchlorate, a thiocyanate, boron fluoride, phosphorus fluoride, arsenic fluoride, aluminum fluoride, trifluoromethyl sulfate of an alkali metal, especially lithium.

MODE FOR CARRYING OUT THE INVENTION

The present invention is illustrated more specifically by Examples with reference to the drawings. However, the present invention is not limited to these only.

EXAMPLE 1

A negative electrode of a connection structure shown in FIG. 1 was manufactured. That is, FIG. 1 is a partial perspective view showing a connection structure of a collector and a tab of an electrode manufactured in Example 1. (Formation of an active material layer (1) on a collector (2))

TABLE 1

| Active material layer coating-material composition (negative electrode) | | |
|---|---|---|
| Active material | Hard carbon | 86 parts by weight |
| Conductive agent | Pulverized product of expanded graphite | 6 parts by weight |
| Binder | Kynar 741 (manufactured by Elf-Atochem Japan) | 8 parts by weight |
| Solvent | NMP | 150 parts by weight |

As shown in Table 1, 8 parts by weight of the binder was dissolved in 150 parts by weight of the solvent NMP (N-methylpyrrolidone), and 86 parts by weight of the active material and 6 parts by weight of the pulverized product of expanded graphite were added. These were mixed with a hyper-mixer. Subsequently, the mixture was subjected to an ultrasonic dispersing machine to form a coating-material. The coating-material is applied onto one surf ace of a strip collector (2) made of a copper foil having a thickness of 18 μm, and dried to form an active material layer. In the same manner, an active material layer was formed on another surface of the copper foil. The coating amount was the same on both the surfaces, and it was 10 mg per $cm^2$ of one surface in terms of the amount of the active material layer. The coated layer was compressed with a roller press to obtain an active material layer (1) having a thickness of 100 μm on one surface. Subsequently, it was cut to obtain an electrode. Further, a structure was provided in which an active material layer was not formed on one end of the copper foil of the collector and the copper foil of the collector was exposed. (Connection of a tab (3))

TABLE 2

| Coating-material composition for tab connection | | |
|---|---|---|
| Graphite | Natural graphite (center particle diameter 25 μm) | 70 parts by weight |
| Binder | Kynar 741 (manufactured by Elf-Atochem Japan) | 30 parts by weight |
| Oxalic acid | | 1 part by weight |
| Solvent | NMP | 400 parts by weight |

As shown in Table 2, 30 parts by weight of the binder was dissolved in 400 parts by weight of the solvent, and 70 parts by weight of graphite and 1 part by weight of oxalic acid were added. These were mixed with the hyper-mixer. The mixture was then subjected to the ultrasonic dispersing machine to form a coating-material for tab connection. The coating-material for tab connection was applied onto the copper foil exposed portion at the end of the collector in an amount of 1 mg/cm$^2$ per unit area in terms of the amount of graphite, and dried. Meanwhile, the coating-material for tab connection was applied onto a portion of a tab (3) to be connected with the collector which tab was made of copper and had a width of 10 mm and a thickness of 20 μm, in an amount of 1 mg/cm$^2$ per unit area in terms of the amount of graphite, and dried.

The portion of the collector coated with the coating-material for tab connection and the portion of the tab coated with the coating-material for tab connection, as obtained in this manner, were overlapped, and compressed with a press at a pressure of 5,000 kg/cm$^2$ to form an electrode in which the tab (3) and the collector (2) were connected via the graphite layer (4) as shown in FIG. 1.

COMPARATIVE EXAMPLE 1

Although an electrode active material layer was formed on a collector in the same manner as in Example 1, the portions to be connected of both the collector and the tab were overlapped without applying the coating-material for tab connection containing graphite thereon and were compressed with a press at a pressure of 5,000 kg/cm$^2$. The collector and the tab were not connected even by the compression.

COMPARATIVE EXAMPLE 2

The same procedure as in Example 1 was conducted except that 70 parts by weight of silver fine particles was used instead of 70 parts by weight of graphite of the coating-material for tab connection in Example 1. The collector and the tab were not connected even by the compression.

EXAMPLE 2

Figure 2:
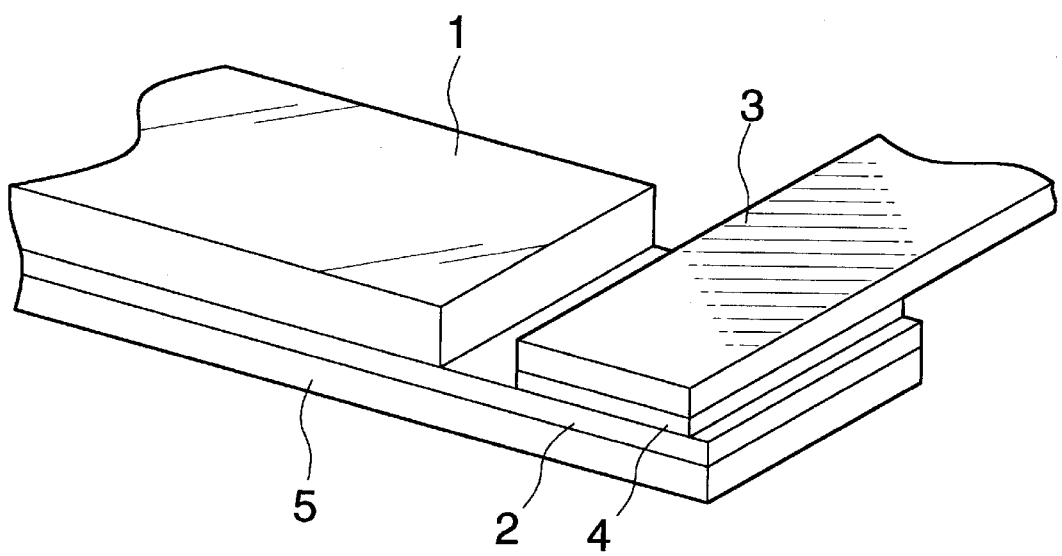
FIG. 2 is a partial perspective view showing an example of a connection structure of a collector and a tab of an electrode according to the invention.

A positive electrode of a connection structure shown in FIG. 2 was manufactured. That is, FIG. 2 is a partial perspective view showing a connection structure of a collector and a tab of an electrode manufactured in Example 2.

In this Example, a product in which aluminum was deposited to a thickness of 1 μm on a PET film (5) having a thickness of 11 μm was used as a collector (2).

(Formation of an active material layer (1) on a collector (2))

TABLE 3

| Active material layer coating-material composition (positive electrode) | | |
|---|---|---|
| Active material | LiNi$_{0.8}$Co$_{0.2}$O$_2$ | 88 parts by weight |
| Conductive agent | Artificial graphite | 8 parts by weight |
| Binder | Kynar 741 (manufactured by Elf-Atochem Japan) | 4 parts by weight |
| Solvent | NMP | 67 parts by weight |

As shown in Table 3, 4 parts by weight of the binder was dissolved in 67 parts by weight of the solvent, and 88 parts by weight of the active material (LiNi$_{0.8}$Co$_{0.2}$O$_2$) and 8 parts by weight of the conductive agent were added. These were mixed with a hyper-mixer. Subsequently, the mixture was subjected to an ultrasonic dispersing machine to form a coating-material. The coating-material was applied onto the collector (2) formed on the PET film (5), and dried to form an active material layer. The coating amount was 20 mg per cm$^2$ in terms of the amount of the active material layer. The coated layer was compressed with a roller press to obtain an active material layer (1) having a thickness of 70 μm. Subsequently, it was cut to obtain an electrode. Further, a structure was provided in which an active material layer was not formed on one end of the aluminum deposition film of the collector and the collector was exposed.

(Connection of the tab (3))

TABLE 4

| Coating-material composition for tab connection | | |
|---|---|---|
| Graphite | Natural graphite (center particle diameter 25 μm) | 70 parts by weight |
| Binder | Kynar 741 (manufactured by Elf-Atochem Japan) | 30 parts by weight |
| Solvent | NMP | 400 parts by weight |

As shown in Table 4, 30 parts by weight of the binder was dissolved in 400 parts by weight of the solvent, and 70 parts by weight of graphite was added. These were mixed with the hyper-mixer. Subsequently, the mixture was subjected to the ultrasonic dispersing machine to form a coating-material. The coating-material for tab connection was applied onto the aluminum deposition film exposed portion at the end of the collector in an amount of 1 mg/cm$^2$ per unit area in terms of the amount of graphite, and dried. Meanwhile, the coating-material for tab connection was applied onto a portion of a tab (3) to be connected with the collector which tab was made of aluminum and had a width of 10 mm and a thickness of 20 μm, in an amount of 1 mg/cm$^2$ per unit area in terms of the amount of graphite, and dried.

The portion of the collector coated with the coating-material for tab connection and the portion of the tab coated with the coating-material for tab connection, as obtained in this manner, were overlapped, and compressed with a press at a pressure of 5,000 kg/cm$^2$ to form an electrode in which the tab (3) and the collector (2) were connected via the graphite layer (4) as shown in FIG. 2.

COMPARATIVE EXAMPLE 3

An electrode active material layer was formed on a collector in the same manner as in Example 2. The collector and the tab were welded using a spot welding machine, but the tab could not be welded with the collector.

(Physical connection of the tab)

In order to detect whether the tab was physically connected with the collector, the active material layer portion of the electrode and the end with which the tab was not connected were manually pulled. The results are shown in Table 5.

(Electrical connection of the tab)

In order to detect whether the tab was electrically connected with the collector, an electrical resistance between the tab and the collector was measured with a tester. The results are shown in Table 5.

TABLE 5

| | Physical connection | Electrical resistance |
|---|---|---|
| Example 1 | fully connected | 0 Ω |
| Comparative Example 1 | soon separated | unmeasurable |
| Comparative Example 2 | soon separated | unmeasurable |
| Example 2 | fully connected | 0 Ω |
| Comparative Example 3 | soon separated | unmeasurable |

As is apparent from Table 5, in the electrodes obtained in Examples 1 and 2, the collector and the tab are connected well physically and electrically via the graphite layer.

Especially when the resin film was used as a support of the collector, they could not be connected through ordinary welding as shown in Comparative Example 4. However, in the present invention, the tab and the collector are connected well.

The connection sites of the collector and the tab in Examples are selected as required according to the purpose of the battery. Further, a desired battery can be manufactured by an ordinary method using the electrodes obtained in Examples.

The present invention can be practiced in other various modes without deviating from the spirits or the main characteristics thereof. Accordingly, the above-described Examples are a mere illustration in all respects, and are not limitedly interpreted. Further, modifications belonging to the scope of claims all fall within the scope of the present invention.

INDUSTRIAL APPLICABILITY

According to the present invention, as stated above, the electrode for the battery in which the collector and the tab are strongly connected is obtained quite simply without impairing the electrical connection instead of the ordinary welding method.

The present invention is especially effective for the connection of the collector formed on the resin support as a conductive thin film with the tab which connection has been so far almost impossible through the welding. In such an electrode, the energy density per unit weight can be increased. Consequently, a lightweight battery having a high discharge capacity is obtained.

Various desired batteries can be produced by an ordinary method using the electrode for the battery of the present invention.

What is claimed is:

1. An electrode for a battery comprising a collector, an electrode active material layer on a first surface portion of the collector and an electrode tab, the collector and the tab being connected via a graphite layer, wherein the graphite layer is between the tab and a second surface portion of the collector.

2. The electrode for the battery according to claim 1, wherein the collector is made of a conductive thin film formed on a surface of a resin film or a resin sheet.

3. A battery having the electrode for the battery according to claim 1 or 2 wherein the electrode is at least one of a positive electrode and a negative electrode.

4. A non-aqueous electrolyte battery having the electrode for the battery according to claim 1 or 2 wherein the electrode is at least one of a positive electrode and a negative electrode.

5. A method of manufacturing an electrode for a battery comprising an electrode active material layer, a collector and an electrode tab by connecting the collector with the electrode tab, which method comprises forming a graphite layer on at least one of a surface of the collector to be connected with the tab and a surface of the tab to be connected with the collector, overlapping the portions to be connected of the collector and the tab on each other with the graphite layer interposed between the connector and the tab, and applying a pressure to the overlapped portions of the collector and the tab to connect the collector with the tab.

6. The method of manufacturing the electrode for the battery according to claim 5, wherein the collector and the tab are connected by applying a pressure using a press.

7. A battery having the electrode for the battery obtained by the method according to claim 3 or 4 wherein the electrode is at least one of a positive electrode and a negative electrode.

8. A non-aqueous electrolyte battery having the electrode for the battery obtained by the method according to claim 3 or 4 wherein the electrode is at least one of a positive electrode and a negative electrode.

* * * * *